United States Patent
Zatsky

[11] 3,950,078
[45] Apr. 13, 1976

[54] LIQUID CRYSTAL DISPLAY

[75] Inventor: Norman C. Zatsky, Southbury, Conn.

[73] Assignee: Timex Corporation, Waterbury, Conn.

[22] Filed: Oct. 16, 1974

[21] Appl. No.: 508,473

[52] U.S. Cl. ............................ 350/160 LC; 58/50 A
[51] Int. Cl.² ...................... G02F 1/13; G04B 19/30
[58] Field of Search..... 58/50 A, 127 R; 340/378 R; 350/160 LC

[56] References Cited
UNITED STATES PATENTS

| 3,811,751 | 5/1974 | Myer | 350/160 LC |
| 3,841,083 | 10/1974 | Bergey | 58/50 R |
| 3,864,905 | 2/1975 | Richardson | 58/50 R |
| 3,869,195 | 4/1975 | Aldrich et al. | 350/160 LC |
| 3,882,490 | 5/1975 | Tashiro | 58/50 R |

FOREIGN PATENTS OR APPLICATIONS

| 21,552 | 9/1967 | Japan | 58/50 R |

*Primary Examiner*—Edith Simmons Jackmon

[57] ABSTRACT

An electrooptic display for watches with improved night visibility comprises a liquid crystal cell with actuatable character segments and polarizing elements mounted on either side thereof, a reflector behind one of the polarizer elements and light emitting segments on the reflector aligned with the character segments.

In a first embodiment, the reflector has thin lines of phosphorescent material painted on its surface adjacent the polarizing element. In a second embodiment, the reflector has small slits aligned with the character segments and a phosphorescent material is painted into the slit area behind the reflector.

Both embodiments preferably employ a display having clear or light characters against a dark background. Thus during nighttime use, light radiating from the phosphorescent material may be seen by the viewer through each energized (or transparent) segment. Light from the phosphorescent material behind deenergized segments is blocked. The outer polarizing element may be rotatable from a crossed position through an angle of 90° to provide a dark on light display for optimum daytime viewing.

6 Claims, 5 Drawing Figures

LIQUID CRYSTAL DISPLAY

BACKGROUND OF THE INVENTION

The present invention relates to liquid crystal displays and particularly to field effect liquid crystal displays which are illuminated for improved night visibility.

The prior art includes various solid state watches with liquid crystal displays. These displays in some instances have been provided with an illuminated background to enhance nighttime visibility. Nevertheless, the displays suffer from a significant degradation in appearance during daytime due to the use of a translucent diffuser incorporated in the design which fails to reflect a sufficient amount of incident light to the viewer. Such displays would, therefore, appear dark or relatively ill-defined in comparison with the display of the present invention.

Representative of the prior art is U.S. Pat. No. 3,731,986 to Fergason which issued May 8, 1973 on display devices using liquid crystal light modulation. Fergason discloses the use of either crossed or uncrossed polarizers on opposite sides of the nematic liquid crystal material but he does not disclose the features of the present invention which enhance nighttime viewing. Similarly, the disclosure of U.S. Pat. No. 3,592,526 to Dryer which issued July 13, 1971, discloses a light transmissive device for twisting the plane of polarization of polarized light by rotating the walls of a liquid crystal cell.

Bergey U.S. Pat. No. 3,722,206 issued Mar. 27, 1973 discloses a self-illuminated liquid crystal timepiece including liquid crystals disposed between a clear front glass and a dark back reflector glass and a nuclear powered light source surrounding the display face to provide light under dark conditions. Neither the polarizers or reflecting arrangement of the present invention are disclosed.

U.S. Pat. No. 3,799,647 to Luft discloses a constant visibility electro-optic display using a PLZT material rather than a liquid crystal material. The display includes an electro-optic plate having a partially transparent reflector plate mounted behind the plate and a pair of polarizers on either side of the arrangement, whereas the relationship of reflectors and polarizers is different in the present invention and the reflector comprises generally a layer of deposited material.

Also of interest is U.S. Pat. No. 3,668,861 to Mitsui, issued June 13, 1972, disclosing a watch having a liquid crystal display system operable at high levels of ambient illumination and a solid state system operable at low levels of ambient illumination. Further prior art in the general area of the invention includes U.S. Pat. No. 3,499,702 to Goldmacher et al., issued Mar. 10, 1970 and U.S. Pat. No. 3,625,591 to Freiser, issued Dec. 7, 1971. The patents cited above are, of course, not intended to be an all inclusive listing of pertinent patents since other patents of such nature may exist.

SUMMARY OF THE INVENTION

The present invention relates to a liquid crystal display which include illuminated characters to enhance nighttime visibility. The display comprises a liquid crystal cell having polarizing elements mounted on both sides thereof and a reflector on the back of the rear polarizer. The display includes segments which are selectively activated to form characters such as digits or watch hands.

In a first embodiment light emitting segments are applied to the reflector surface beneath and aligned with the character segments.

In a second embodiment, the reflector comprises the optimum aluminum or silver opaque reflective material into which are scribed small slits behind each segment of the digits. Behind the reflector, a phosphorescent material is painted to cover the slit area.

Light radiating from the phosphorescent material is thereby seen by the viewer through each activated or energized character segment while the light from beneath de-energized character segment is blocked. One polarizer may optionally be rotatable so that if it is desired to change the display to dark digits against a light background for daytime viewing, one of the polarizers is merely rotated 90°.

Accordingly, an object of this invention is to provide a new and improved liquid crystal display to improve nighttime viewing.

Another object of this invention is to provide a new and improved liquid crystal display for watches which provides improved viewing under both day and night conditions.

BRIEF DESCRIPTION OF THE DRAWINGS

Other objects and advantages of this invention may be seen more clearly from the following description when viewed in conjunction with accompanying drawings wherein.

DETAILED DESCRIPTION OF THE INVENTION

Figure 1:
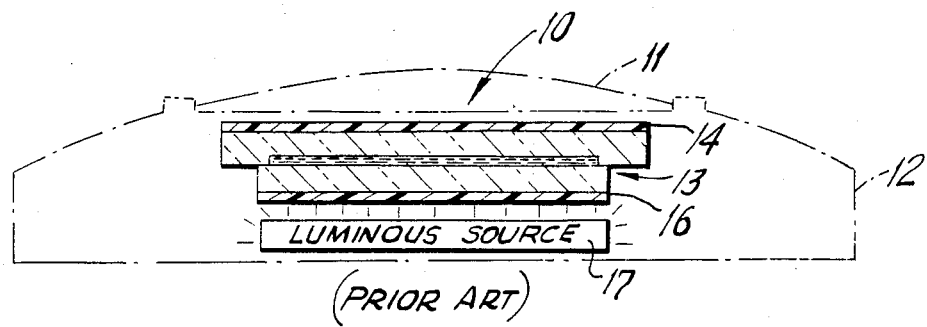
FIG. 1 shows a prior art liquid crystal display with an internal light source.

Referring now to the drawings, the prior art is depicted in FIG. 1, wherein a liquid crystal display 10 is located as shown in phantom beneath a crystal 11 within a watch case 12. The liquid crystal display 10 comprises a liquid crystal cell 13 of conventional design having a polarizing element 14 mounted on the upper surface thereof and a rear polarizing element 16 mounted on the bottom of said cell 13. A luminous source 17 is provided to enhance nighttime visibility of the display 10 when ambient light conditions are low by further outlining the numerals against a light background. The display 10, however, suffers from a significant degradation in appearance during daytime viewing due to the lack of sufficent contrast and the present invention is designed to overcome this difficulty.

Figure 2:
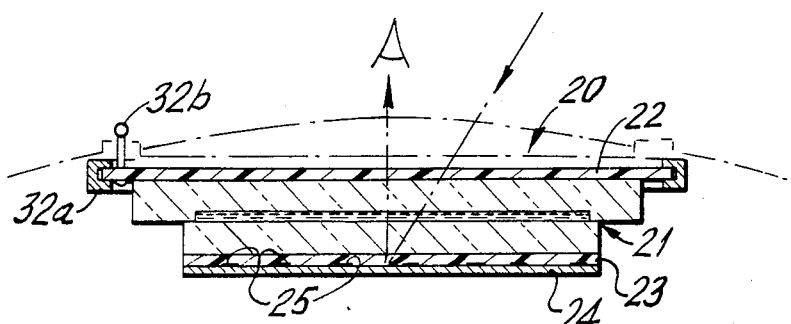
FIG. 2 shows the improved liquid crystal display of a first embodiment of the present invention in cross-section.

A first embodiment of the invention as disclosed in FIG. 2 comprises a liquid crystal display 20 including a liquid crystal cell 21 having a first polarizing element 22 mounted on the upper surface thereof and a second polarizing element 23 mounted on the lower surface thereof. The display indicia are in the form of conventional character segments which are energized in a predetermined and known manner to form letters, numerals or watch hands. Reflection of ambient light is achieved by mounting an aluminum reflector 24 having both specular and diffusing properties adjacent to the second polarizing element 23. Typically reflector 24 could be brushed or matte finished aluminum or silver.

Thin lines 25 of light emitting or phosphorescent material are painted or otherwise applied to the reflector 24. Lines 25 are aligned with the segments of characters 31 (see FIG. 4).

Figure 3:
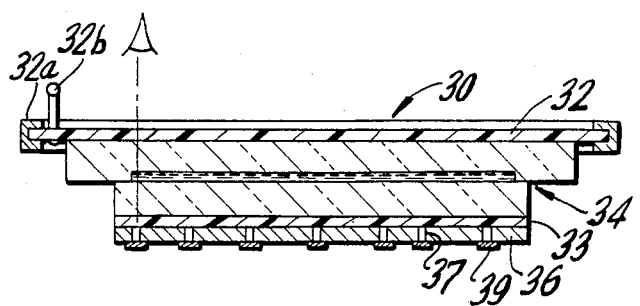
FIG. 3 shows a second embodiment of the invention in cross-section including tritium paint applied over slits in the reflector in order to provide a light source.

In the second embodiment shown in FIG. 3, a reflector 36 mounted or deposited on the bottom of rear polarizing element 33 is aluminum or silver opaque material into which are scribed small slits 37 centered behind each segment 38 of the digits or characters 31. Behind the reflector 36, a phosphorescent material 39 such as tritium paint is painted over and into the slit areas.

In both embodiments shown in FIGS. 2 and 3, and display 30 is adapted to form clear or light characters 31 against a dark background, or dark characters against a light background. This is accomplished by selectively rotating either of the two polarizing elements 32 and 33 which are mounted adjacent the liquid crystal cell 34 through an angle of 90°. It is preferred to rotate the upper polarizing element 32 which is circular for this purpose and is mounted in a supporting ring 32a and provided with an extension 32b protruding outside the watch or other device for manual actuation.

Figure 4:
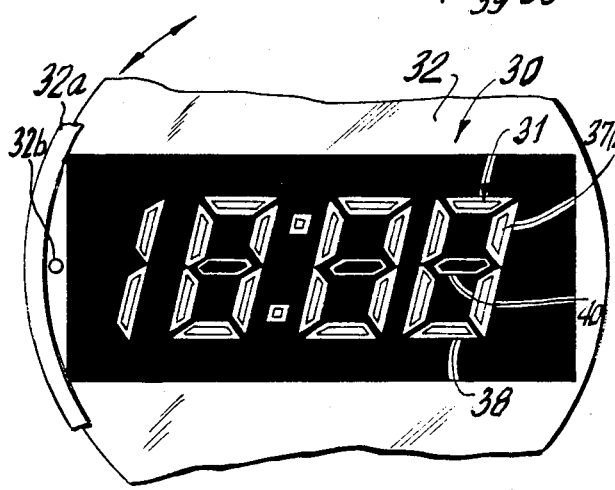
FIG. 4 is a plan view of the displays of FIGS. 2 or 3 showing light digits against a dark background for nighttime viewing.
Figure 5:
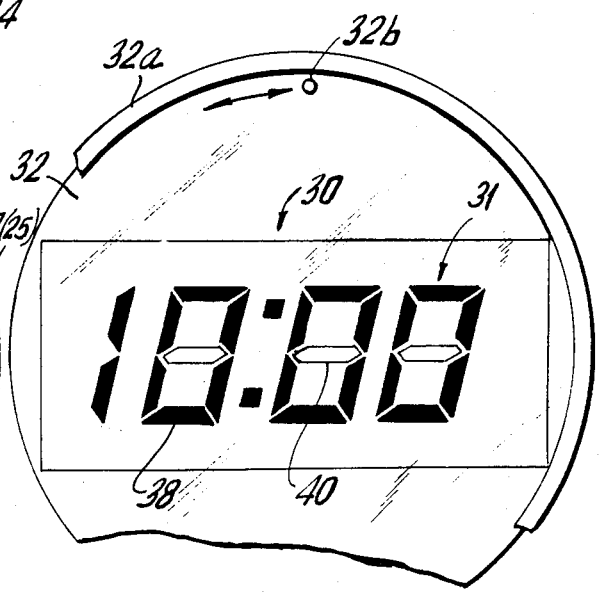
FIG. 5 is a plan view of the display FIG. 4 showing dark digits against a light background for daytime viewing.

FIGS. 4 and 5 illustrate a display adapted for digital presentation, although the invention is not so limited. In FIG. 4 the polarizers are placed for nighttime viewing, i.e. with light on dark presentation of characters 31. Energized segments 38 are transparent. Light from the phosphorescent material (either lines 25 of FIG. 2 or slits 31 of FIG. 3) passes through energized character segments 38. Light is blocked by de-energized segments which appear dark along with the background.

It may be found that for optimum daytime viewing, a dark on light display is preferred over a light on dark display. Should this be the case, the upper polarizing element 32 may be manually rotated using extension 32b. During the daytime the polarizing element 32 is positioned to give a presentation as indicated in FIG. 5 to provide a dark on light display. The light emitting material is not discernible beneath the now transparent unenergized segments 40 and light transmission from the light-emitting material is blocked by the now opaque energized segments 38. At nighttime the user rotates the upper polarizer 90° again and thereby obtains a light on dark display necessary for the proper transmission of light from the light-emitting segments.

While the invention has been explained with respect to use in a watch by a detailed description of certain specific embodiments, it is understood that other uses are possible and that various modifications and substitutions can be made within the scope of the appended claims which are intended also to include equivalents of such embodiment.

I claim:

1. A liquid crystal display comprising:
    a liquid crystal cell having a plurality of selectively activated segments to form display characters,
    a first polarizing element disposed on one side of said cell and a second polarizing element disposed on the other side of said cell,
    a reflector disposed on the opposite side of the second polarizing element from the cell, and
    a plurality of thin phosphorescent light emitting segments aligned with and behind said character segments.

2. The combination according to claim 1 wherein:
    said light emitting segments comprise thin lines of phosphorescent material applied to the reflector surface adjacent the second polarizing element.

3. The combination according to claim 1 wherein:
    said reflector has small slits aligned with said character segments and wherein phosphorescent material is applied to the reflector slits on the reflector surface opposite the second polarizing element.

4. The combination according to claim 1 wherein the reflector comprises an aluminum or silver opaque coating on the second polarizing element.

5. The combination according to claim 1 wherein said light emitting segments are comprised of tritium paint.

6. The combination according to claim 1 wherein the first polarizing element is rotatable with respect to the second polarizing element to provide a dark on light display during the daytime and a light on dark display during the nighttime.

* * * * *